US012020580B2

(12) United States Patent
Loots et al.

(10) Patent No.: US 12,020,580 B2
(45) Date of Patent: Jun. 25, 2024

(54) FLIGHT PLAN STORAGE AND RECOVERY SYSTEM AND METHOD

(71) Applicant: HONEYWELL INTERNATIONAL INC., Charlotte, NC (US)

(72) Inventors: Dennis Loots, Phoenix, AZ (US); Satish Hegde, Bangalore (IN); Raghu Shamasundar, Bangalore (IN); Chad Stephenson, Glendale, AZ (US); Wen Hua Liu, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 432 days.

(21) Appl. No.: 17/115,130

(22) Filed: Dec. 8, 2020

(65) Prior Publication Data

US 2022/0130258 A1 Apr. 28, 2022

(30) Foreign Application Priority Data

Oct. 22, 2020 (IN) ............................ 202011046051

(51) Int. Cl.
*G08G 5/00* (2006.01)

(52) U.S. Cl.
CPC ........... *G08G 5/003* (2013.01); *G08G 5/0013* (2013.01); *G08G 5/0021* (2013.01)

(58) Field of Classification Search
CPC ..... G08G 5/003; G08G 5/0013; G08G 5/0021
See application file for complete search history.

(56) References Cited

U.S. PATENT DOCUMENTS

| | | | | |
|---|---|---|---|---|
| 6,112,141 | A * | 8/2000 | Briffe | G01C 23/00 345/1.3 |
| 8,521,340 | B2 | 8/2013 | Coulmeau | |
| 9,938,008 | B2 | 4/2018 | Stabler et al. | |
| 9,946,258 | B2 | 4/2018 | Kwan | |
| 2006/0149432 | A1 * | 7/2006 | Robinson | G01C 23/005 701/3 |
| 2007/0219678 | A1 | 9/2007 | Colmeau et al. | |

(Continued)

FOREIGN PATENT DOCUMENTS

| | | | |
|---|---|---|---|
| CN | 108255149 | A1 | 7/2018 |
| EP | 0803787 | B1 | 8/2001 |

OTHER PUBLICATIONS

Honeywell, "Airbus Pegasus FMS for the Airbus A330 and A320 Series Technical Summary," C61-1647-000-000, Sep. 2016.

(Continued)

*Primary Examiner* — Donald J Wallace
(74) *Attorney, Agent, or Firm* — Lorenz & Kopf LLP

(57) ABSTRACT

A system and method of storing and recovering a flight plan includes loading flight plan data into working memory of an aircraft flight management system (FMS). When the FMS determines that a storage triggering event has occurred, a copy of at least a portion of the flight plan data is transmitted from the working memory to a non-volatile storage medium. A display command is supplied to a display device, at least following recovery of the FMS from a severe reset, that causes the display device to render a retrieval prompt. A retrieval command is received at the FMS, via a user input device, that causes the FMS to retrieve the at least a portion of the flight plan data from the non-volatile memory and store it in the working memory.

20 Claims, 4 Drawing Sheets

(56) References Cited

U.S. PATENT DOCUMENTS

| | | | | |
|---|---|---|---|---|
| 2016/0179327 | A1 * | 6/2016 | Zammit-Mangion | G06F 3/0482 701/3 |
| 2019/0149404 | A1 | 5/2019 | Toews et al. | |
| 2019/0311632 | A1 * | 10/2019 | Hochwarth | H04W 12/08 |
| 2020/0310907 | A1 | 10/2020 | Das et al. | |
| 2022/0036669 | A1 * | 2/2022 | Brace | G06F 11/0775 |

OTHER PUBLICATIONS

UAV Navigation, "UAV Navigation In Depth: Autopilot Memory Management," Mar. 14, 2009.

Griguere, Henri; Flight Management System Back-Up Navigation for the A330/A340 Aircraft; Oct. 14, 1991 (Oct. 14, 1991), pp. 482-486, XP000309289, ISBN: 978-0-7803-0116-0.

* cited by examiner

FLIGHT PLAN STORAGE AND RECOVERY SYSTEM AND METHOD

CROSS REFERENCE TO RELATED APPLICATION

The present application claims benefit of prior filed Indian Provisional Patent Application No. 202011046051, filed Oct. 22, 2020, which is hereby incorporated by reference herein in its entirety.

TECHNICAL FIELD

The present disclosure generally relates to an aircraft flight management system, and more particularly relates to a flight plan storage and recovery system and method.

BACKGROUND

Many modern aircraft include a flight management system (FMS). As is generally known, the FMS is a specialized processing system that automates a variety of in-flight tasks such as in-flight management of the flight plan. Using various onboard sensors, the FMS determines aircraft position and guides the aircraft along its flight plan.

The flight plan, as is generally known, comprises, but is not limited to, a set of aircraft data that is generally referred to as flight plan data. The flight plan data is typically input by a user (e.g., pilot or other flight crew member) or via datalink from an Airline Operational Center (AOC) and is stored in the FMS working memory, such as processor random-access-memory (RAM). The flight plan data is generally retained over processor restarts, which may occur as a result of minor software or data errors. Thus, it can be readily re-established, and the flight plan continued with minimal pilot interruption.

Though highly unlikely, it is postulated that repetitive occurrences of software or data errors could occur in the FMS. This event could result in the purposeful, complete, and severe loss of all data, including the flight plan data. Such an unlikely, yet postulated event is referred to as "severe reset." If a severe reset were to occur, it is assumed that there is data corruption or inconsistency within the FMS working memory. As a result, the FMS working memory would be forcefully cleared in order to re-establish a working FMS, albeit without the previously entered flight plan data.

As may be appreciated, if the flight plan data is cleared during flight, it would place an increased workload upon the flight crew to re-enter and attempt to reconstruct the original flight plan. The workload increase would be even more pronounced if this were to occur during a critical phase of flight, such as during the descent or approach flight phases.

Hence, there is a need for a system and method that does not rely on flight crew re-entry and/or reconstruction of an aircraft flight plan following an unlikely, yet postulated event that causes a complete loss of flight plan data from the FMS working memory. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of storing and recovering a flight plan includes loading flight plan data into working memory of an aircraft flight management system (FMS). When determination is made, in the FMS, that a storage triggering event has occurred, a copy of at least a portion of the flight plan data is transmitted from the working memory to a non-volatile storage medium. A display command is supplied from the FMS to a display device, at least following recovery of the FMS from a severe reset, that causes the display device to render a retrieval prompt. A retrieval command is received at the FMS, via a user input device, that causes the FMS to retrieve the at least a portion of the flight plan data from the non-volatile memory and store it in the working memory. The severe reset is defined as one or more software errors that causes the FMS to clear its working memory.

In another embodiment, a flight plan storage and recovery system includes a non-volatile storage medium, a display device, a user input, and a flight management system (FMS). The non-volatile storage medium is configured to receive and store flight plan data. The display device is configured to receive display commands. The user input device is configured to receive user input. The FMS includes working memory, is in operable communication with the non-volatile storage medium, the display device, and the user input device, and configured to: receive and load flight plan data into the working memory; determine when a storage triggering event has occurred; transmit a copy of at least a portion of the flight plan data from the working memory to the non-volatile storage medium, in response to determining that the storage triggering event has occurred; supply a display command to the display device, at least following recovery of the FMS from a severe reset, that causes the display device to render a retrieval prompt, wherein the severe reset is defined as one or more software errors that causes the FMS to clear the working memory; and retrieve the at least a portion of the flight plan data from the non-volatile memory and store it in the working memory upon receipt of a retrieval command from the user input device.

Furthermore, other desirable features and characteristics of the flight plan storage and recovery system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
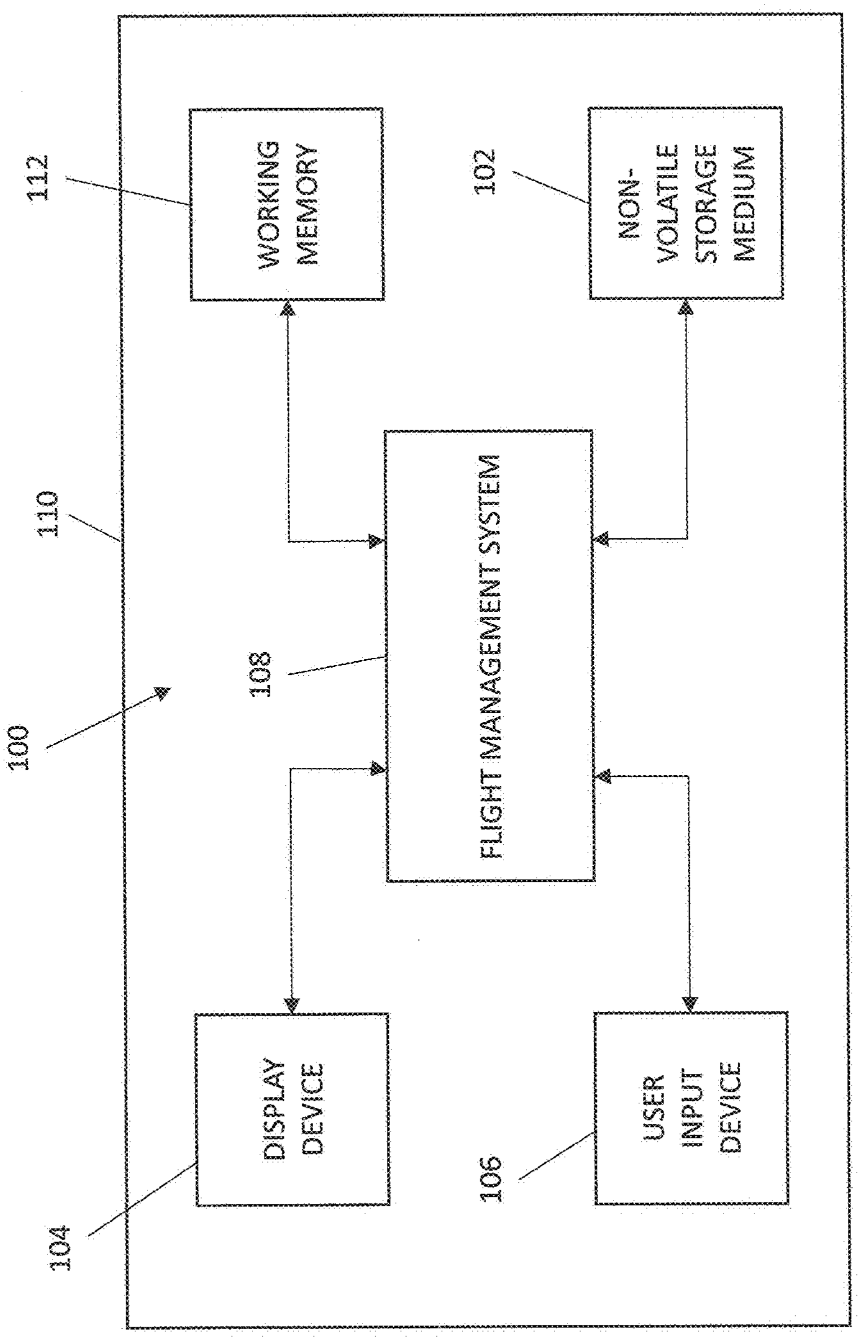
FIG. 1 depicts a functional block diagram of one embodiment of a flight plan storage and recovery system.

Referring to FIG. 1, one embodiment of a flight plan storage and recovery system 100 is depicted and includes a non-volatile storage medium 102, a display device 104, a user input device 106, and a flight management system (FMS) 108. In the embodiment depicted in FIG. 1, the entire system 100 is installed within an aircraft 110. However, as will be further described, in some embodiments portions of the system 100 may be readily transported into and removed from the aircraft 110. In other embodiments, portions of the system 100 may be disposed separate and remote from aircraft 110.

The non-volatile storage medium 102 is configured to receive and store at least flight plan data. The non-volatile storage medium will retain the stored flight plan data in the unlikely occurrence of a sever reset. The non-volatile storage medium 102 may be an integral part of the FMS 108, as depicted in FIG. 1, or it may be disposed in one or more devices external to the FMS 108. If the non-volatile storage medium 102 is disposed in one or more devices external to the FMS 108, the non-volatile storage medium 102 may be disposed in one or more portable devices that are readily transported into and removed from the aircraft 110 or it may be permanently disposed separate and remote from the aircraft.

Figure 2:
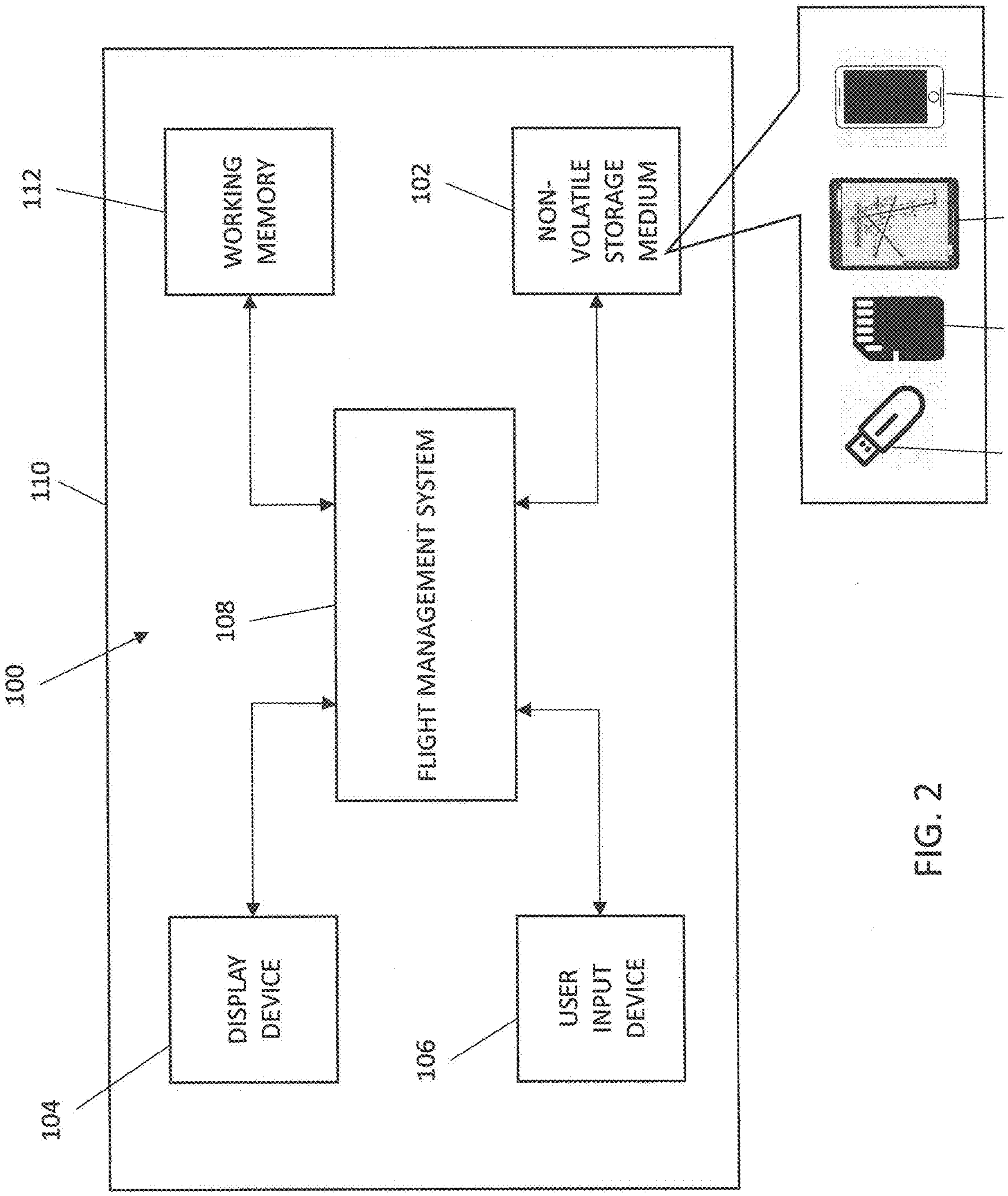
FIGS. 2 and 3 depict functional block diagrams of alternative embodiments of the flight plan storage and recovery system.
Figure 3:
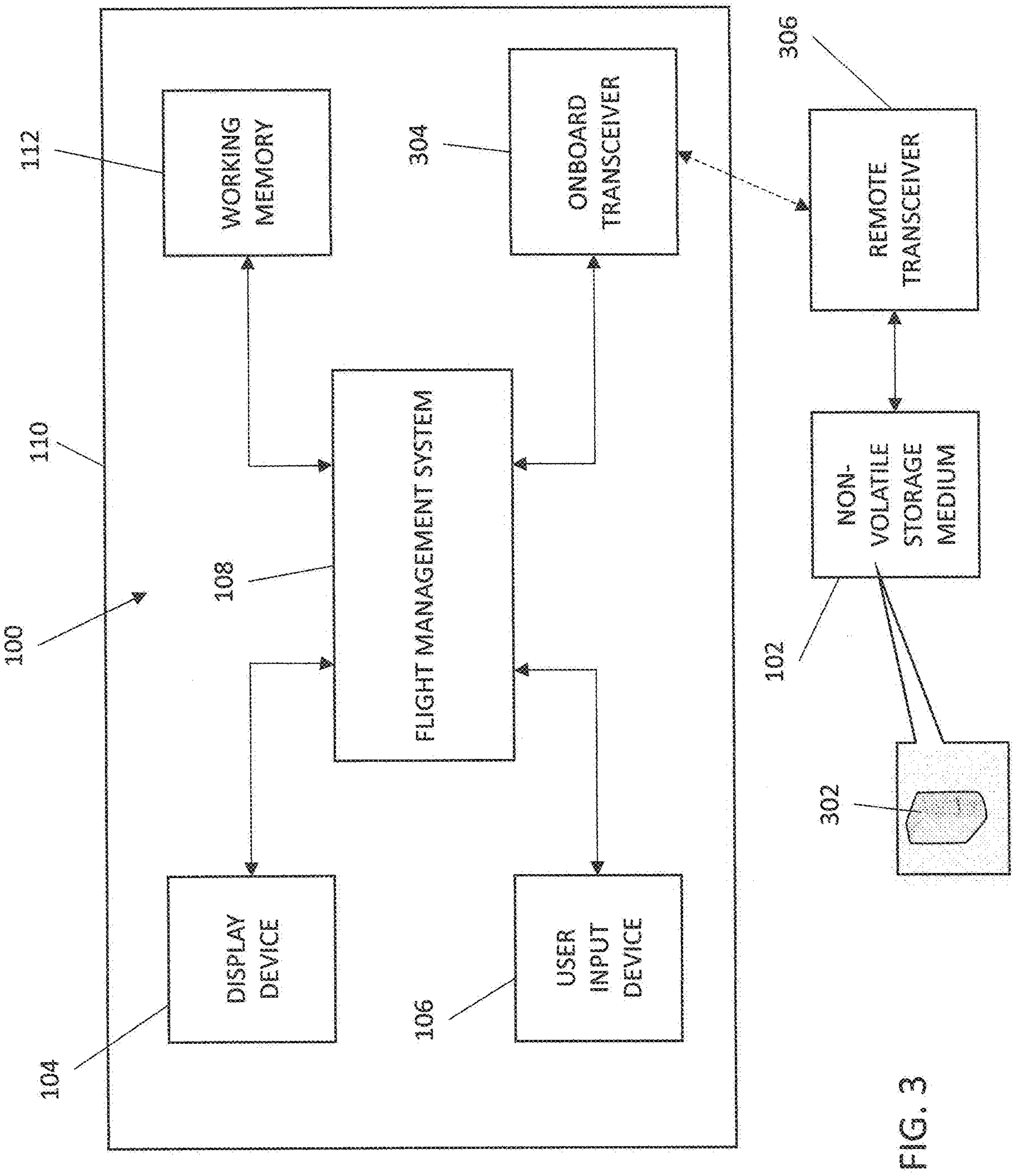
Figure 4:
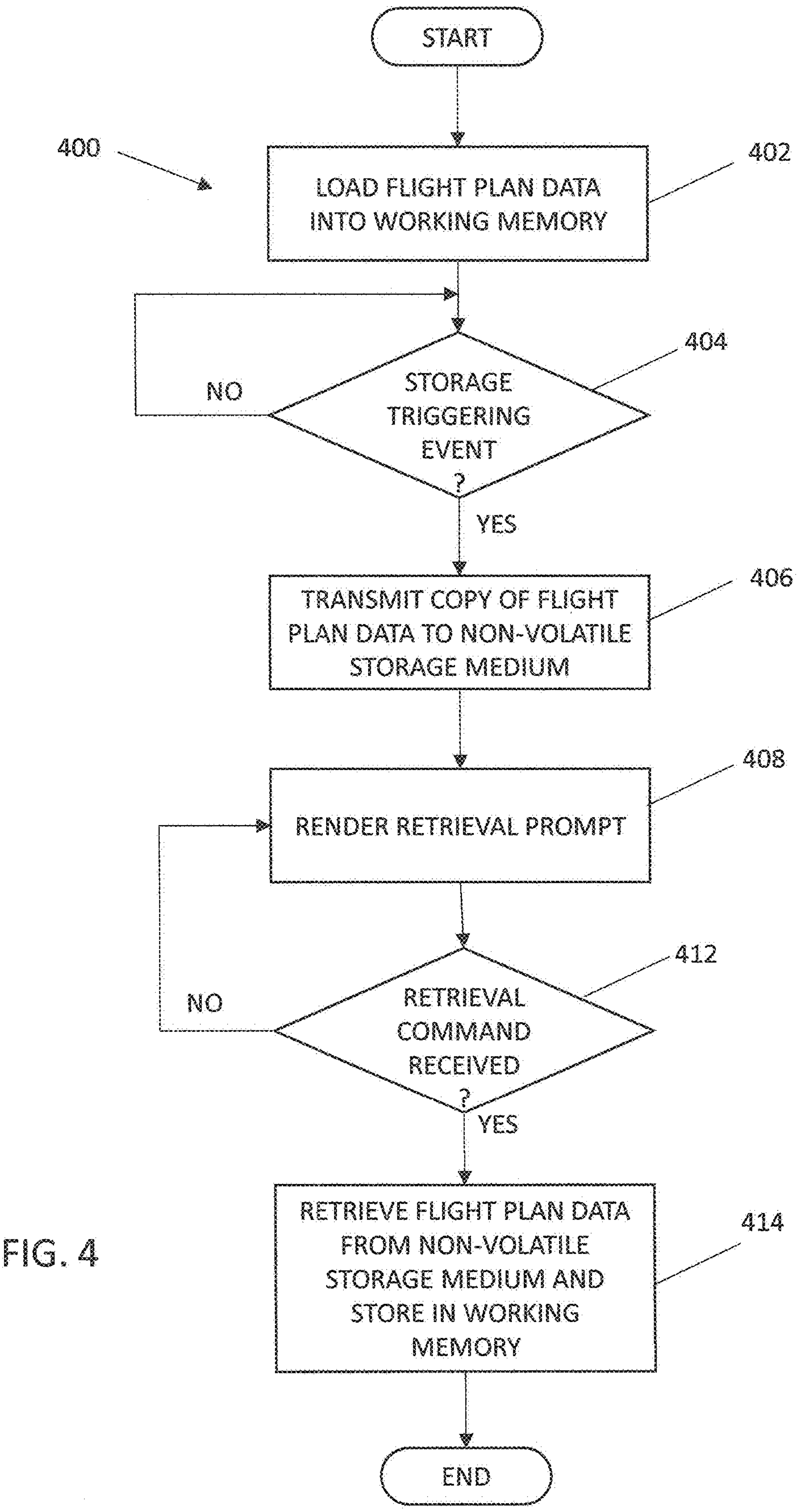
FIG. 4 depicts a process, in flowchart form, that may be implemented by the flight plan storage and recovery system.

As FIG. 2 depicts, some non-limiting examples of portable devices that form part of the system 100 during system operation include various types of portable storage devices, such as a USB drive 202, an SD card 204, or the like, an electronic flight bag 206, and a smartphone 208. As FIG. 3 depicts, a non-limiting example of a device disposed separate and remote from the aircraft 110 includes a remote server device 302, just to name one example. As FIG. 3 further depicts, when the non-volatile storage device 102 is disposed separate and remote from the aircraft 110, the system 100 additionally includes an onboard transceiver 304 that is configured to wirelessly transmit data to, and receive data from, a remote site. Moreover, the non-volatile storage medium 102 will be in operable communication with a remote transceiver 306, at the remote site, that is configured to wirelessly transmit data to, and receive data from, onboard transceiver 304.

The display device 104 is in operable communication with the FMS 108. The display device 104 is configured to receive display commands from at least the FMS 108 and is operable, upon receipt of the display commands, to render one or more graphical representations or images, as described in greater detail below. The display device 104 may be any one or more of numerous head-up display devices or head down display devices. Some non-limiting examples of suitable display devices include multi-function display (MFD), a primary flight display (PFD), and a multi-function control and display unit (MCDU), just to name a few.

The user input device 106 is coupled to the FMS 108 and is configured to receive user input. The user input device 106 and the FMS 108 are cooperatively configured to allow a user (e.g., a pilot, co-pilot, or other flight crew member) to interact with the display device 104 and/or other elements of the system 100. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 and the display device 104 may be formed as part of an integral unit (e.g., MCDU).

The FMS 108 includes at least working memory 112 and is in operable communication with the non-volatile storage medium 102, the display device 104, and the user input device 106. The working memory 112 is preferably integral to the FMS 108 but may, in some embodiments, be disposed separate from the FMS 108. The FMS 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the FMS 108 includes processing logic that may be configured to carry out the functions, techniques, and processing tasks that automate the flight plan and that implement the additional functions that are described in greater detail below. Furthermore, the steps of a method or algorithm described in connection with the embodiments disclosed herein may be embodied directly in hardware, in firmware, in a software module executed by the FMS 108, or in any practical combination thereof. The FMS 108 is configured to read and execute computer-executable programming instructions or other data that cause the FMS 108 to execute and perform one or more of the processes, tasks, operations, and/or functions described herein.

The FMS 108, as previously noted, is a specialized processing system that automates, among other things, the flight plan. The flight plan is generally determined on the ground before departure by either the pilot or a dispatcher for the aircraft flight crew. The flight plan, which comprises, but is not limited to, a set of aircraft data that is generally referred to as flight plan data, may be manually entered into the FMS 108 or selected from a library of common routes. In other embodiments the flight plan may be loaded via a communications data link from an airline dispatch center. During preflight planning, additional relevant aircraft performance data may be entered including information such as: gross aircraft weight; fuel weight and the center of gravity of the aircraft. Regardless of how the flight plan data is entered, the FMS 108 is configured to receive and load the flight plan data into the working memory 112. The FMS 108 uses the flight plan data stored in the working memory to automate the flight of the aircraft.

Although highly unlikely, it is postulated that the FMS 108 could experience a "severe reset" event. A severe reset, as defined herein, is one or more software errors that would the cause FMS 108 to clear the working memory 112. This would result in loss of the flight plan data. Thus, the depicted FMS 108 is additionally configured to implement additional functionality to store and recover a flight plan that has been loaded and stored in the working memory 112. This additional functionality will now be described.

The FMS 108 is additionally configured to determine when a storage triggering event has occurred and, in response to determining that the storage triggering event has occurred, to transmit a copy of at least a portion of the flight plan data from the working memory 112 to the non-volatile storage medium 102. The storage triggering event may be a manual event or an automatic event. If it is a manual event, the storage triggering event is a storage command that is transmitted from the user input device 106 to the FMS 108. For example, the FMS 108 may command the display device 104 to render and indicator that prompts the pilot to transmit the storage command, via the user input device 106, to the FMS 108.

If the storage triggering event is an automatic event, it is preferably an aircraft-related event. For example, the FMS 108 may transmit a copy of at least a portion of the flight plan data from the working memory 112 to the non-volatile storage medium 102 when one or more of the aircraft engines are started. Or it could do so when the aircraft commences its take-off roll, or when the aircraft commences its take-off Any one of numerous other aircraft-related events could also define the storage triggering event. Preferably, however, the aircraft-related event is a relatively early operational event. This is because transmitting a copy of at least a portion of the flight plan data at a relatively early operational event ensures the active flight plan is preserved for potential later use with a low probability for any inherent data inconsistency early in the flight.

The FMS 108 is also configured to supply a display command to the display device 104 that causes the display device to generate a retrieval prompt. The FMS 108 may command the display device 104 to continuously render the retrieval prompt, or it may command the display device 104 to render the retrieval prompt following recovery of the FMS 108 from a severe reset. If the retrieval prompt is continuously rendered, the pilot may, via the user input device 106, supply a retrieval command to the FMS 108 at any time, regardless of whether a severe reset recovery has occurred. Regardless of whether the recovery prompt is continuously rendered or is rendered only following a severe reset recovery, the FMS 108 is configured, upon receipt of a retrieval command from the user input device 106, to retrieve the flight plan from the non-volatile memory 102 and store it in the working memory 112. The flight crew can then perform any other modification, as need or required, to re-establish the remaining flight plan route. It will be appreciated that the retrieval command is preferably generated manually (e.g., via the user input device 106) to provide a level of protection against automatically inserting potentially erroneous flight plan.

It is further noted that the flight plan data that is transmitted and stored to the non-volatile storage medium 102 is retained until the FMS 108, in response to another storage triggering event, transmits new flight plan data to overwrite the previously stored flight plan data. The FMS 108 may also be configured, in response to user input supplied to the user input device 106, to transmit a clear command to the non-volatile storage medium 102 that clears the flight plan data from the non-volatile storage medium 102.

The system 100 described above implements a process for storing and recovering a flight plan. The process 200 is depicted in flowchart form in FIG. 2, and with reference thereto will now be described. In doing so, parenthetical reference numerals refer to like flowchart symbols in FIG. 2.

The depicted process 400 is initiated when flight plan data is loaded into the working memory 112 of the FMS 108 (402). Thereafter, the FMS 108 determines whether or not a storage triggering event has occurred (404). If a storage triggering event has not occurred, then the process loops until a storage triggering event does occur. If the FMS 108 determines that a storage triggering event has occurred, it transmits a copy of at least a portion of the flight plan data from the working memory 112 to the non-volatile storage medium 102 (406).

The FMS 108 then supplies a display command to the display device 104 that causes the display device 104 to render a retrieval prompt (408). As noted above, this display command may be issued so that the display device 104 continuously renders the retrieval prompt, or only after the FMS 108 experiences recovery from a severe reset.

The FMS 108 then determines if it receives a retrieval command from the user input device 106 (412). If it does not, then the process loops until the user input device supplies the retrieval command, at which point the FMS 108 retrieves the flight plan data from the non-volatile memory 102 and stores it in the working memory 112 (414).

The system and method described herein does not rely on flight crew re-entry and/or reconstruction of an aircraft flight plan following an unlikely, yet postulated event that causes a complete loss of flight plan data from the FMS working memory.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of storing and recovering a flight plan for an aircraft, comprising the steps of:

loading flight plan data into working memory of an aircraft flight management system (FMS);

determining, in the FMS, that a storage triggering event has occurred;

transmitting a copy of at least a portion of the flight plan data from the working memory to a non-volatile storage medium, in response to the FMS determining that the storage triggering event has occurred;

supplying a display command from the FMS to a display device, at least following recovery of the FMS from a severe reset, that causes the display device to render a retrieval prompt;

receiving a retrieval command at the FMS, via a user input device, that causes the FMS to retrieve the at least a portion of the flight plan data from the non-volatile memory and store it in the working memory; and using, via the FMS, the retrieved at least a portion of the flight plan to automate a remaining portion of a flight of the aircraft, wherein the severe reset is defined as one or more software errors that causes the FMS to clear its working memory.

2. The method of claim 1, further comprising:

transmitting a clear command to the non-volatile storage medium that clears the at least a portion of the flight plan data from the non-volatile storage medium.

3. The method of claim 2, wherein the clear command is transmitted in response to user input supplied to the user input device.

4. The method of claim 1, wherein the non-volatile storage medium is an integral part of the FMS.

5. The method of claim 1, wherein the non-volatile storage medium is a portable memory device.

6. The method of claim 1, wherein the non-volatile storage medium is disposed remote from the FMS.

7. The method of claim 1, wherein the storage triggering event comprises supplying a storage command, via the user input device, to the FMS.

8. The method of claim 1, wherein the storage triggering event comprises an aircraft-related event.

9. The method of claim 8, wherein the aircraft-related event includes starting one or more aircraft engines, commencing a take-off roll, or commencing aircraft take-off.

10. The method of claim 1, wherein the display command that causes the display device to render the prompt is supplied from the FMS before the recovery of the FMS from the severe reset.

11. A flight plan storage and recovery system, comprising:

a non-volatile storage medium configured to receive and store flight plan data;

a display device configured to receive display commands;

a user input device configured to receive user input; and a flight management system (FMS) comprising working memory, the FMS in operable communication with the non-volatile storage medium, the display device, and the user input device, the FMS configured to:

receive and load flight plan data into the working memory;

determine when a storage triggering event has occurred;

transmit a copy of at least a portion of the flight plan data from the working memory to the non-volatile storage medium, in response to determining that the storage triggering event has occurred;

supply a display command to the display device, at least following recovery of the FMS from a severe reset, that causes the display device to render a retrieval prompt, wherein the severe reset is defined as one or more software errors that causes the FMS to clear the working memory;

retrieve the at least a portion of the flight plan data from the non-volatile memory and store it in the working memory upon receipt of a retrieval command from the user input device; and automate a remaining portion of a flight of the aircraft using the retrieved at least a portion of the flight plan.

12. The system of claim 11, wherein the FMS is further configured to:

transmit a clear command to the non-volatile storage medium that clears the at least a portion of the flight plan data from the non-volatile storage medium.

13. The system of claim 12, wherein the FMS is further configured to transmit the clear command in response to user input supplied to the user input device.

14. The system of claim 1, wherein the non-volatile storage medium is an integral part of the FMS.

15. The system of claim 11, wherein the non-volatile storage medium is a portable memory device.

16. The system of claim 11, wherein the non-volatile storage medium is disposed remote from the FMS.

17. The system of claim 11, wherein the storage triggering event comprises transmitting a storage command from the user input device to the FMS.

18. The system of claim 11, wherein the storage triggering event comprises an aircraft-related event.

19. The system of claim 18, wherein the aircraft-related event includes starting one or more aircraft engines, commencing a take-off roll, or commencing aircraft take-off.

20. The system of claim 11, wherein the display command that causes the display device to render the prompt is supplied from the FMS before the recovery of the FMS from the severe reset.

* * * * *